Oct. 3, 1967     R. J. GONZALEZ     3,344,878
KNOCKDOWN WEIGHING SCALE
Filed Sept. 10, 1964
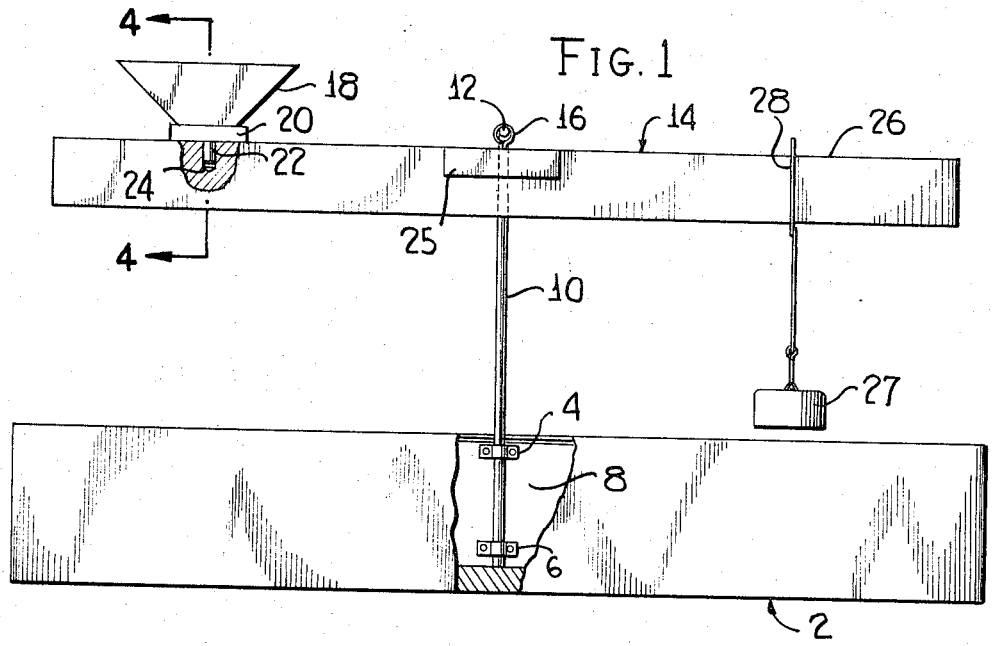
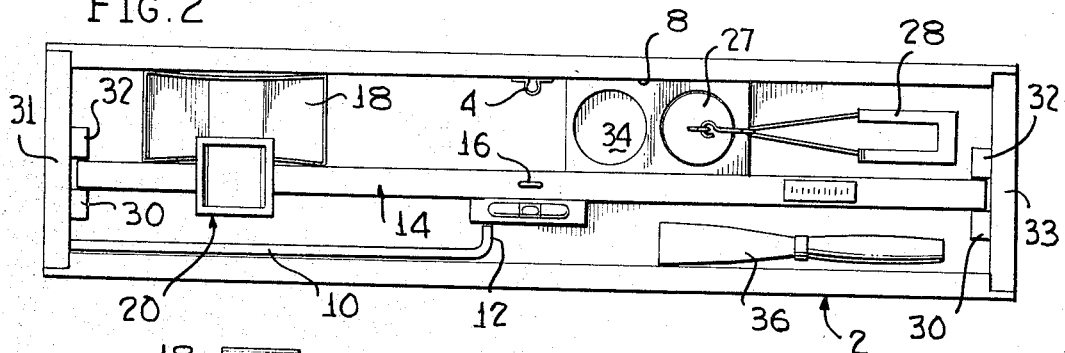
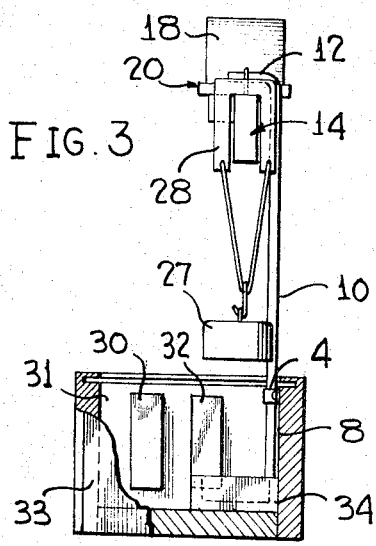
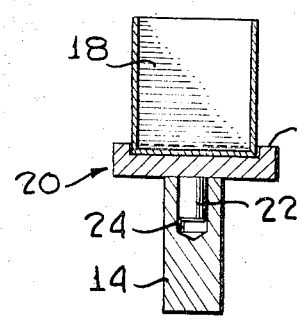
INVENTOR
RAUL JIMENEZ GONZALEZ
BY *Otto John Munz*
ATTORNEY

United States Patent Office 3,344,878
Patented Oct. 3, 1967

3,344,878
KNOCKDOWN WEIGHING SCALE
Raul Jimenez Gonzalez, Monte Parnaso 157,
Mexico City 10, Mexico
Filed Sept. 10, 1964, Ser. No. 395,429
2 Claims. (Cl. 177—127)

ABSTRACT OF THE DISCLOSURE

The scale is disassemblable. The beam of the scale is then inserted between guides in its container and the pan of the scale is wedged between the beam and a lateral wall of the container, thereby locking pan and beam firmly within the container.

---

This invention relates to a knockdown weighing scale and more particularly to a moisture measuring device for use in the field.

It is an object of this invention to provide a knockdown weighing scale and soil hygrometer which can be disassembled and packaged for easy transportation to the location in which it is to be used and which can be easily assembled at the selected location.

It is a further object of the invention to provide a device which is accurate and rugged.

It is a further object of this invention to provide a device which will indicate directly the weight of water in a test sample.

These and other objects of the invention will be manifest upon reading the following description in conjunction with the accompanying drawings wherein:

FIGURE 1 is an elevational view partly in section of the assembled device.

FIGURE 2 is a plan view of the packaged device with the cover omitted.

FIGURE 3 is an end elevation partly in section.

FIGURE 4 is a section on line 4—4 of FIGURE 1.

Referring now to the drawing there is shown in FIGURE 1 a wooden box 2 which serves as a container for the apparatus when packaged for transportation. A pair of guide members 4 and 6 are secured to an inner side of wall 8 of the container to hold a support 10 in a vertical position. The support is an L shaped metal rod with leg 12 of the rod bent at right angles to the long body portion and which serves as a fulcrum for the weighing beam 14. The weighing beam is of wood and provided with a hanger 16 in the form of a ring centrally thereof for pivotal engagement with the leg 12.

A support 20 in the form of a square plate is mounted on the beam on one side of the fulcrum by a pin 22 secured to the center of the plate and received in an opening 24 in the beam at a preselected fixed distance from the fulcrum. The support plate is provided with an upstanding flange 21 around the periphery for cooperation with a container bottom which is of a shape to be snugly received in the opening defined by the flange and plate. The container or pan 18 is symmetrical about a central plane and is provided with a bottom shaped as aforesaid. By leveling the soil in the container the construction described accurately locates the centre of gravity of the soil specimen, container, and support plate at the preselected distance from the fulcrum. A level bubble indicator 25 is secured to the beam with the centre thereof adjacent and aligned with the fulcrum and a scale 26 is secured to the opposite side of the beam.

A weight 27 is supported by means of a stirrup 28 which cooperates with the scale to indicate the moisture content of the soil sample.

The box is shown in FIGURE 2 as provided with spaced guides 30 and 32 on end walls 31 and 33 which are spaced a distance substantially equal to the thickness of the beam 14 so as to firmly support the beam during transportation. The pan 18 is of a resilient material such as metal or plastic and of a width slightly greater than the distance between wall 8 and beam 14. When the pan is wedged between the wall and beam it is slightly distorted and thus supplies sufficient pressure to retain the parts during transportation. The box is also supplied with shallow wells 34 in the bottom thereof to snugly receive weights only one of which is shown in this figure. A putty knife or equivalent tool 36 is shown as fitted in a groove shaped to receive it as is the support 10.

In use, the cover (not shown) of the box is removed and the support 10 is removed from its mooring and fitted in the guides 4, 6. The weighing beam hanger is fitted over the fulcrum 12 and the stirrup carrying the balance weight 27 is placed on the zero mark of the scale. The tool 36 is then used to put soil in the container 18. When a standard amount of soil is in the container the beam will be level as indicated by the bubble indicator 25. The soil is then dried by any convenient means such as a camp fire and replaced on the weighing beam. The stirrup carrying the indicator is then moved along the scale until the bubble indicates the beam is level and the scale is then read.

The scale can be divided to give the weight of water that was in the test sample or to indicate the percentage of water that was in the sample.

It should be understood that it is not intended to limit the invention to the above described forms and details, and that the invention includes such other forms and modifications as are embraced by the scope of the appended claims.

What is claimed is:

1. A knockdown weighing scale package comprising a container having a bottom, side walls, and end walls, spaced guides secured to opposed faces of the end walls, a weighing beam fitted between the guides and spaced from the side walls, and a pan between the beam and a side wall, the pan having a dimension slightly greater than the distance between the beam and side wall whereby the slight distortion of the pan firmly wedges the beam and pan in the container.

2. A package as recited in claim 1 wherein the bottom of the container is provided with a plurality of wells shaped to snugly receive a balance weight and support.

References Cited

UNITED STATES PATENTS

| | | | |
|---|---|---|---|
| 299,812 | 6/1884 | Lazarus. | |
| 379,746 | 3/1888 | Watt | 177—127 |
| 645,091 | 3/1900 | Harmon | 177—127 |
| 691,437 | 1/1902 | Bogue | 177—171 XR |
| 809,602 | 1/1906 | Barakat | 177—172 |
| 997,091 | 7/1911 | Reichmann | 177—127 |
| 1,932,638 | 10/1933 | Rogers | 206—16 |
| 1,997,820 | 4/1935 | Govoni | 206—16 |
| 2,033,640 | 3/1936 | Mears | 206—1 |
| 2,210,800 | 8/1940 | Devine | 177—171 XR |
| 2,228,872 | 1/1941 | Durfee | 177—126 XR |
| 3,082,833 | 3/1963 | Myers | 177—127 |

RICHARD B. WILKINSON, *Primary Examiner.*

STEPHEN J. TOMSKY, *Examiner.*

R. S. WARD, *Assistant Examiner.*